(12) United States Patent
Waita

(10) Patent No.: US 11,628,577 B2
(45) Date of Patent: Apr. 18, 2023

(54) ROBOT HAND

(71) Applicant: Honda Motor Co., Ltd., Tokyo (JP)

(72) Inventor: Hironori Waita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/674,804

(22) Filed: Feb. 17, 2022

(65) Prior Publication Data

US 2022/0305669 A1 Sep. 29, 2022

(30) Foreign Application Priority Data

Mar. 24, 2021 (JP) .............................. JP2021-050598

(51) Int. Cl.
| | |
|---|---|
| B25J 15/08 | (2006.01) |
| B25J 15/00 | (2006.01) |
| B25J 9/10 | (2006.01) |
| B25J 15/02 | (2006.01) |
| B25J 15/10 | (2006.01) |

(52) U.S. Cl.
CPC ......... B25J 15/0009 (2013.01); B25J 9/1045 (2013.01); B25J 15/0233 (2013.01); B25J 15/10 (2013.01)

(58) Field of Classification Search
CPC ... B25J 15/0009; B25J 9/1045; B25J 15/0233
See application file for complete search history.

(56) References Cited

FOREIGN PATENT DOCUMENTS

| CN | 101664930 A | * | 3/2010 | .......... B25J 15/0009 |
| CN | 106003129 A | * | 10/2016 | .......... B25J 15/0009 |
| CN | 111196495 A | * | 5/2020 | .......... B25J 11/0045 |
| JP | 2017503668 | | 2/2017 | |
| WO | WO-2014027897 A1 | * | 2/2014 | ............ A61F 2/583 |

* cited by examiner

*Primary Examiner* — Randellj J Krug
(74) *Attorney, Agent, or Firm* — JCIPRNET

(57) ABSTRACT

A robot hand includes: a first link; a first fixed pulley and a second fixed pulley, respectively provided at a proximal end pivot part of the first link and rotatable around a first axis; a second link, supported at an intermediate pivot part by the first link to be rotatable around a second axis; a lever link, supported by the proximal end pivot part of the first link to be rotatable around the first axis; a lever pulley, supported by the lever link; a hanging cable, hung on the first fixed pulley, the lever pulley, and the second fixed pulley; a conversion mechanism, connecting the lever link and the second link, and converting rotation of the lever link into rotation of the second link; and a second link driving mechanism, rotating the lever link around the first axis by pulling the hanging cable.

10 Claims, 7 Drawing Sheets

(A)

(B)

ROBOT HAND

CROSS-REFERENCE TO RELATED APPLICATION

This application claims the priority benefit of Japan application serial no. 2021-050598 filed on Mar. 24, 2021. The entirety of the above-mentioned patent application is hereby incorporated by reference herein and made a part of this specification.

BACKGROUND

Technical Field

The disclosure relates to a robot hand imitating a human hand.

Description of Related Art

A robot hand for a humanoid robot, which includes a palm and five fingers, has been disclosed in the conventional art (see, for example, Patent Document 1). The robot hand has an actuator shared by multiple fingers, and includes two spreaders capable of spreading the force generated by the actuator toward the fingers.

Each finger contains links connected via multiple joints and is actuated through driving of two tie rods. Specifically, the finger can be stretched through driving of one of the tie rods, and can be bent through driving of the other tie rod. One of the spreaders stretches multiple fingers through one of the tie rods, and the other spreader bends multiple fingers through the other tie rod.

The spreaders are connected to each other through a cable. The cable is hung on a fixed pulley provided at a portion corresponding to the palm. The actuator is connected to the fixed pulley. When the actuator operates to rotate the fixed pulley, one of the spreaders is pulled, and the other is pushed out to bend or stretch the finger.

PRIOR ART DOCUMENT

Patent Document

[Patent Document 1] Japanese Patent No. 6466460.

In the robot hand, a torque generated at a finger joint needs to increase to be able to lift a heavy object. Therefore, the inventors of the present application have thought of increasing the diameter of the pulley for driving the finger disclosed in Patent Document 1.

However, the inventors of the present application notice that, when the diameter of the pulley increases, due to obstruction by the pulley, it is difficult to provide a sensor, etc., for detecting the contact of an object on the palm.

SUMMARY

According to an embodiment of the invention, a robot hand includes: a first link; a first fixed pulley and a second fixed pulley, respectively provided at a proximal end pivot part of the first link and rotatable around a first axis with respect to the first link; a second link, supported at an intermediate pivot part by the first link to be rotatable around a second axis; a lever link, having a proximal end supported by the proximal end pivot part of the first link to be rotatable around the first axis; a lever pulley, supported by a free end of the lever link to be rotatable; a hanging cable, hung on the first fixed pulley, the lever pulley, and the second fixed pulley; a conversion mechanism, connecting the lever link and the second link, and converting rotation of the lever link around the first axis into rotation of the second link around the second axis; and a second link driving mechanism, rotating the lever link around the first axis by driving the hanging cable.

DESCRIPTION OF THE EMBODIMENTS

Figure 1:
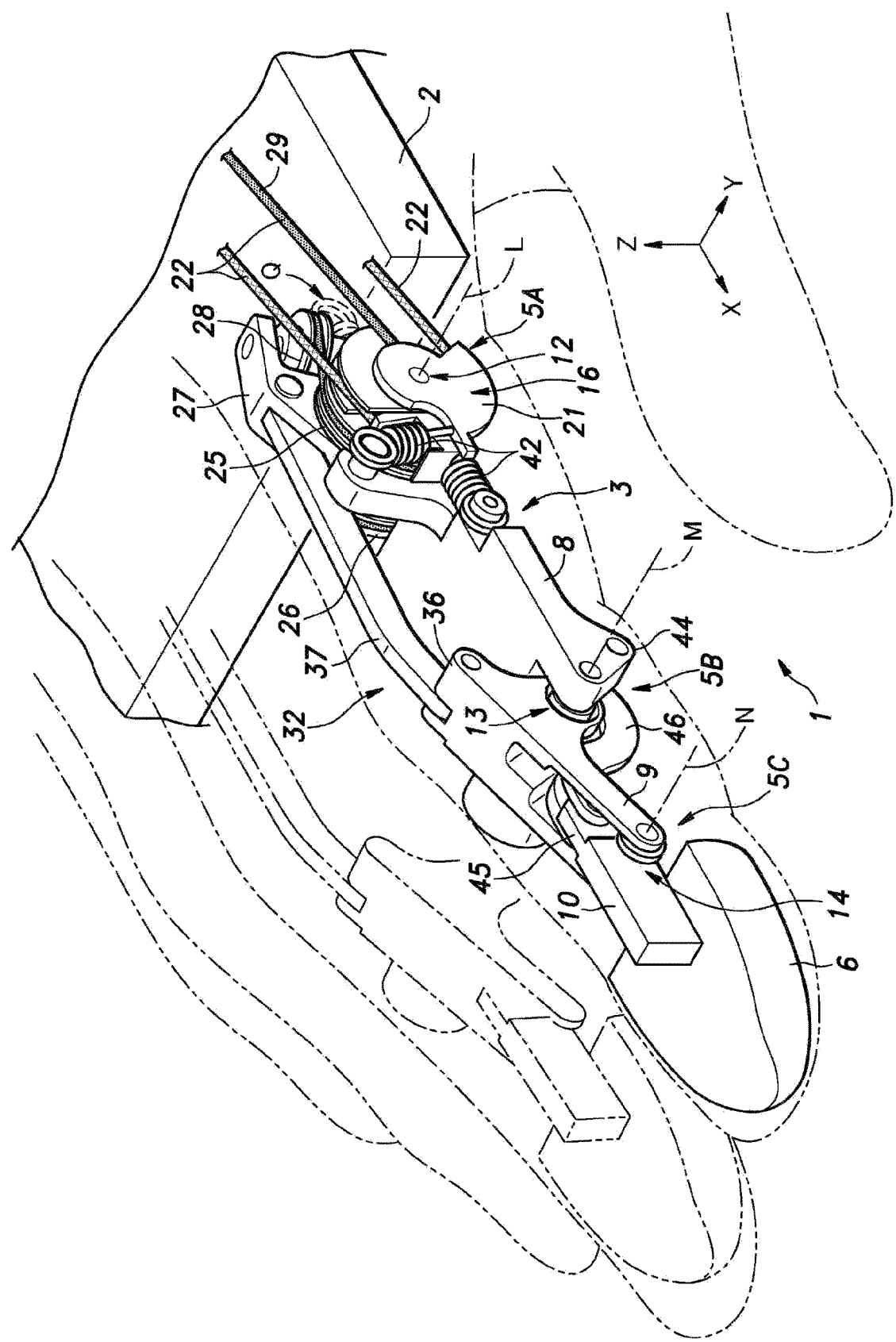
FIG. 1 is a perspective view illustrating a robot hand according to the first embodiment.

An embodiment of the invention provides a robot hand (1, 101). The robot hand includes: a first link (8); a first fixed pulley (25, 25L, 25R) and a second fixed pulley (26, 26L, 26R), respectively provided at a proximal end pivot part (12) of the first link and rotatable around a first axis (L) with respect to the first link; a second link (9), supported at an intermediate pivot part by the first link to be rotatable around a second axis (M); a lever link (27, 27L, 27R), having a proximal end supported by the proximal end pivot part of the first link to be rotatable around the first axis; a lever pulley (28), supported by a free end of the lever link to be rotatable; a hanging cable (29, 129), hung on the first fixed pulley, the lever pulley, and the second fixed pulley; a conversion mechanism (32), connecting the lever link and the second link, and converting rotation of the lever link around the first axis into rotation of the second link around the second axis; and a second link driving mechanism (43), rotating the lever link around the first axis by driving the hanging cable.

According to the configuration, when the second link driving device drives the hanging cable, a force is applied to the lever pulley, and a torque around the first axis is applied to the lever link. The torque applied to the lever link is converted into the torque of the second link by the conversion mechanism.

At this time, the lever pulley is displaced with the lever link, and functions as the so-called movable pulley. Therefore, without increasing the diameter of the pulley, a greater torque can be output to the second link compared with the case where the torque generated by the second link driving device is output to the second link by using a fixed pulley.

Preferably, the robot hand has a base part (2) supporting, at the proximal end pivot part, the first link to be rotatable around the first axis, and the second fixed pulley is supported by the base part.

According to the configuration, by providing a joint between the first link and the base part, the degree of freedom for bending is increased, and it is possible for the robot hand to perform various operations. In addition, the second fixed pulley can be supported by using a simple configuration.

According to an embodiment of the invention, the robot hand has a first link driving part (16) driving rotation of the first link around the first axis, and the first axis is parallel to the second axis.

According to the configuration, a torque applied by the first link driving device and a torque applied by the second link driving device are added up and applied to the joint between the first link and the base part. Therefore, compared with the case with only one of torques, a greater torque around the first axis can be applied to the joint between the first link and the base part.

According to an embodiment of the invention, the first link driving part has a first link driving pulley (21) fixed to the first link so that the first axis is a central axis, a winding cable (22) wound around the first link driving pulley, and a first actuator (23) rotating the first link driving pulley by driving the winding cable.

According to such configuration, the first link driving part can be configured in a simple configuration.

According to an embodiment of the invention, the second link driving device includes a second actuator (31) rotating the lever link around the first axis by pulling the hanging cable.

According to such configuration, the second link driving part can be configured in a simple configuration.

According to an embodiment of the invention, the second link driving device includes a lever urging member (42) applying an urging force to resist the rotation of the lever link around the first axis by the second actuator.

According to the configuration, the lever link can be urged in a direction opposite to the rotation direction by the second actuator. Therefore, by stopping the second actuator, the lever link can be restored to the original position.

According to an embodiment of the invention, the lever pulley is located between the first fixed pulley and the second fixed pulley, and has a central axis (P) extending on a hypothetical plane (S) orthogonal to the first axis.

According to the configuration, the first fixed pulley, the second fixed pulley, and the lever pulley can be arranged together in a small size.

According to an embodiment of the invention, the conversion mechanism includes a second crank arm (36) extending from the intermediate pivot part of the second link and a first auxiliary link (37) supported by the second crank arm and the free end of the lever link to be rotatable, and a first four-segment link mechanism (40) is formed by the lever link, the first auxiliary link, the first link, and the second crank arm.

According to the configuration, the displacement of the lever pulley can be transmitted to the second link by the first four-segment link mechanism.

According to an embodiment of the invention, the first four-segment link mechanism is a parallel link mechanism.

According to the configuration, since the rotation angle of the lever link is equal to the rotation angle of the second link, the posture control of the second link becomes easy.

According to an embodiment of the invention, the robot hand further has: a third link (45) pivotally supported at a free end pivot part (14) by the second link, a first crank arm (44) extending from the intermediate pivot part of the first link, a third crank arm (45) extending from the free end pivot part of the third link, and a second auxiliary link (46) rotatably coupled to the first crank arm and the third crank arm. A second four-segment link mechanism (50) forms a cross-link mechanism with the first crank arm, the second link, the third crank arm, and the second auxiliary link.

According to the configuration, by providing the third link, the robot hand can access an object far away from the base part. In addition, the third link can be rotated by keeping a ratio between the rotation angle of the first link and the rotation angle of the third link at a set angle ratio.

The invention provides a robot hand capable of outputting a greater torque without In the following, the embodiments of the invention will be described in detail with reference to the drawings.

First Embodiment

As shown in FIG. 1, a robot hand 1 is a device provided at a wrist part of a humanoid robot and imitating a human hand. The robot hand 1 is also referred to as a hand device. The robot hand 1, for example, is used for gripping an object, lifting and conveying an object.

The robot hand 1 includes a palm part 2 (also referred to as base part or base) corresponding to a palm supported by a wrist tip end, multiple finger parts 3 connected to the palm part 2, and a driving mechanism 4 (see FIG. 2) driving the finger parts 3.

In a front view, the palm part 2 is formed in a shape corresponding to a human palm. In the embodiment, the palm part 2 includes a palm part main body 2A forming a root portion connected to the wrist part and a connection part 2B (see FIG. 7B) provided for each finger part 3. The palm part main body 2A is substantially in a plate shape. The connection part 2B protrudes from the end part of the palm part main body 2A, and is respectively connected to the end part of the palm part main body 2A and the proximal end side (palm main body part side) of the finger part 3. The proximal end of the connection part 2B is coupled to the palm part main body 2A to be rotatable around an axis C perpendicular to a surface of the palm part main body 2A. The protrusion end of the connection part 2B is rotatably connected to the proximal end of the finger part 3. The palm part 2 is provided with multiple connection parts 2B. A gap is provided between adjacent connection parts 2B. Accordingly, in the palm part 2, a recess is formed between adjacent connection parts 2B.

Each finger part 3 is connected to the palm part 2 via a joint (referred to as proximal phalanx 5A in the following) corresponding to the proximal phalanx of a human hand. In the finger part 3, two bendable joints (respectively referred to as intermediate phalanx 5B and end phalanx 5C in the following) corresponding to the intermediate phalanx and the end phalanx of a human hand are provided. The robot hand 1 is at least switchable between a bent state in which the base phalanx 5A, the intermediate phalanx 5B, and the end phalanx 5C are respectively bent and a stretched state in which the base phalanx 5A, the intermediate phalanx 5B, and the end phalanx 5C are not bent, and the finger part 3 is stretched along the palm part 2 (specifically, the palm part main body 2A). A finger pad part 6 forming a portion corresponding to a finger pad is provided on a surface of one side at the distal end of the finger part 3.

In the following, as shown in FIG. 1, the stretching direction when the finger part 3 is stretched is set as a positive direction on X-axis, a direction perpendicular to the X-axis direction and parallel to the palm part 2 is set as Y-axis, and a direction perpendicular to X-axis and Y-axis and away from the finger pad part 6 is set as Z-axis, and the names of the axes are described as necessary in the description.

Figure 2:
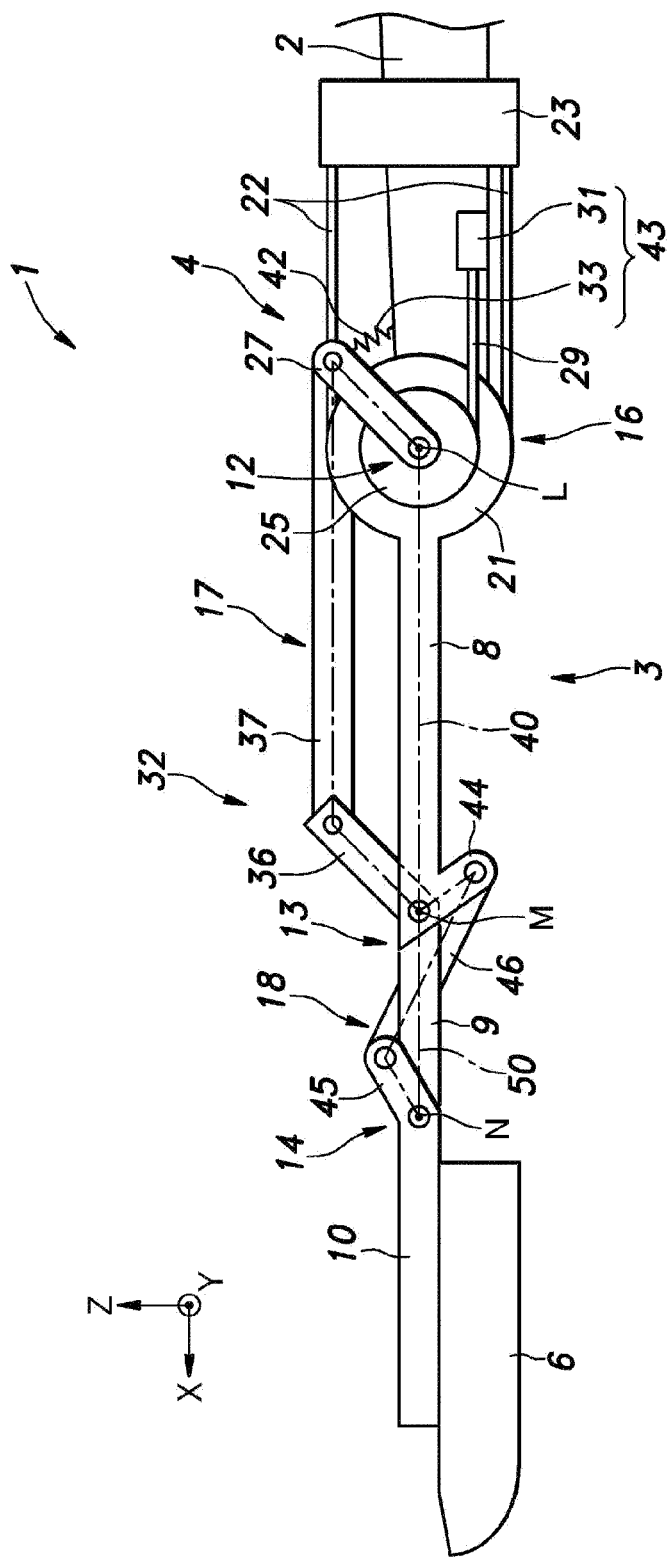
FIG. 2 is a schematic view illustrating the robot hand according to the first embodiment.

FIG. 2 illustrates a schematic diagram briefly illustrating the robot hand 1 at the time of the stretched state. As shown in FIGS. 1 and 2, each finger part 3 includes a first link 8, a second link 9, and a third link 10.

As shown in FIGS. 1 and 2, in the stretched state, the first link 8 extends in a direction away from the edge portion of the palm part 2 (specifically, the protrusion end of the connection part 2B). As shown in FIG. 2, the first link 8 is supported (that is, pivotally supported) by the palm part 2 (the connection part 2B) to be rotatable around a first axis L at a proximal end pivot part 12 located on the proximal end side. In the stretched state, the free end of the first link 8 is located at a position farthest away from the edge portion of the palm part 2. The first axial L is parallel with respect to the main surface of the palm part 2, and is perpendicular to the extending direction of the first link 8. That is, as shown in FIG. 1, the first axis L is parallel to the Y-axis direction, and is also referred to as a 1Y-axis. The connection portion between the first link 8 and the palm part 2 forms the base phalanx 5A of the finger part 3.

In the stretched state, the second link 9 extends in a direction away from the palm part 2. The second link 9 is supported (that is, pivotally supported) by the free end of the first link 8 to be rotatable around a second axis M at an intermediate pivot part 13 located on the proximal end (the end part located on the negative side of X-axis) side. The second axis M is parallel to the first axis L. Accordingly, the second axis M is parallel to the Y-axis direction, and is also referred to as a 2Y axis. In the stretched state, the free end of the second link 9 is located at a position more distant from the palm part 2 than the free end of the first link 8. The connection portion between the second link 9 and the first link 8 forms the intermediate phalanx 5B of the finger part 3.

In the stretched state, the third link 10 extends in a direction away from the palm part 2. The third link 10 is supported (that is, pivotally supported) by the free end of the second link 9 to be rotatable around a third axis N at a free end pivot part 14 located on the proximal end (the end part located on the negative side of X-axis) side. The third axis N is parallel to the first axis L and the second axis M. Accordingly, the third axis N is parallel to the Y-axis direction, and is also referred to as a 3Y axis. In the stretched state, the free end of the third link 10 is located at a position more distant from the palm part 2 than the free end of the second link 9. The connection portion between the third link 10 and the second link 9 forms the end phalanx 5C of the finger part 3. The finger pad part 6 is provided at the free end of the third link 10.

The driving mechanism 4 includes a first link driving part 16 for driving the rotation of the first link 8 with respect to the palm part 2, a second link driving part 17 for driving the rotation of the second link 9 with respect to the first link 8, and a third link driving part 18 for rotating the third link 10 with respect to the second link 9.

The first link driving part 16 has a first link driving pulley 21, a first link driving cable 22 (winding cable), and a first actuator 23.

The first link driving pulley 21 is in a cylindrical shape having a groove on the outer circumferential surface. The first link driving pulley 21 is provided so that the first axis L is the central axis. The first link driving pulley 21 is fixed to a side surface of the first link 8 in the Y-axis direction.

The first link driving cable 22 (hooking cable) is accommodated in the groove provided on the outer circumferential surface of the first link driving pulley 21, and is hooked on the first link driving pulley 21.

As shown in FIG. 2, the first actuator 23 is coupled to and supported by the palm part 2. The first actuator 23 is respectively coupled to two ends of the first link driving cable 22. The first actuator 23 selectively winds up one of the ends of the first link driving cable 22, and unwinds the other end. Accordingly, the first actuator 23 is able to rotate the first link driving pulley 21 in any direction around the first axis L. That is, by driving the first link driving cable 22, the first actuator 23 is capable of being a device (first link driving device) rotating the first link driving pulley 21 in two directions. Furthermore, by maintaining the position of the first link driving cable 22, the first actuator 23 can stop the first link driving pulley 21 at a predetermined position. The first actuator 23, for example, is respectively connected to the end parts of the first link driving cable 22, and is formed by two electric motors collaborating to drive. The electric motors have a servo lock function which prevents shaft rotation when driving stops. The driving of the first actuator 23 is controlled by a control device (not shown) provided in the chest of the robot.

Figure 3:
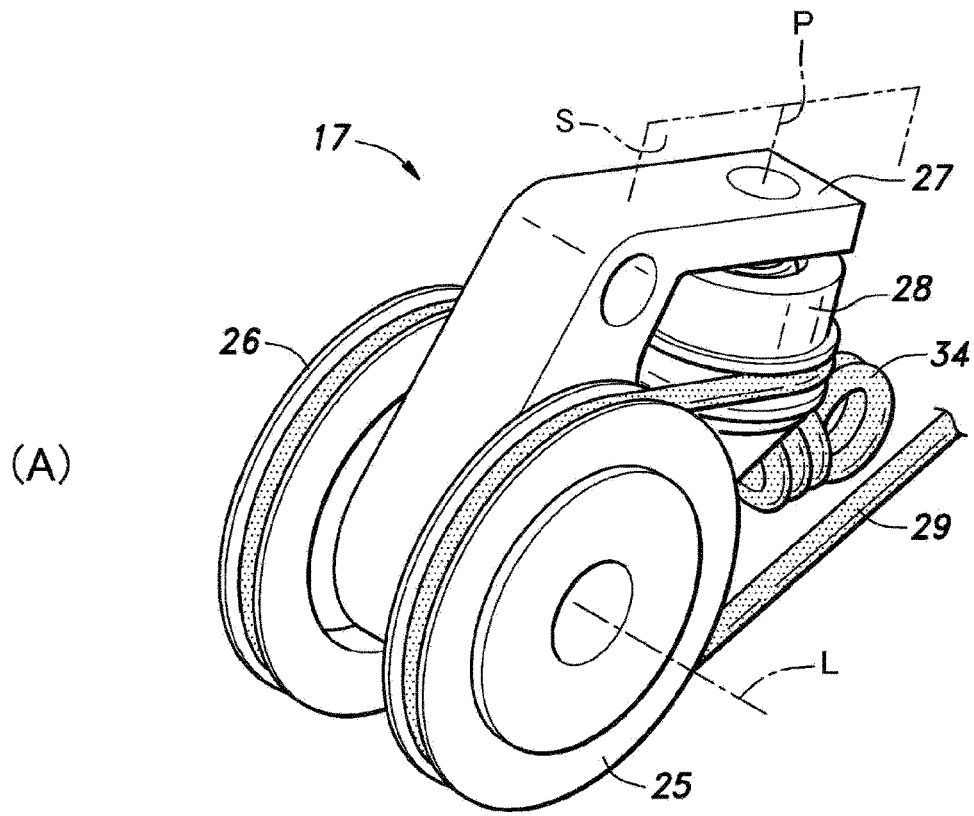
In FIG. 3, (A) is a perspective view illustrating a portion of a second link driving part, and (B) is a side view thereof.
Figure 3:
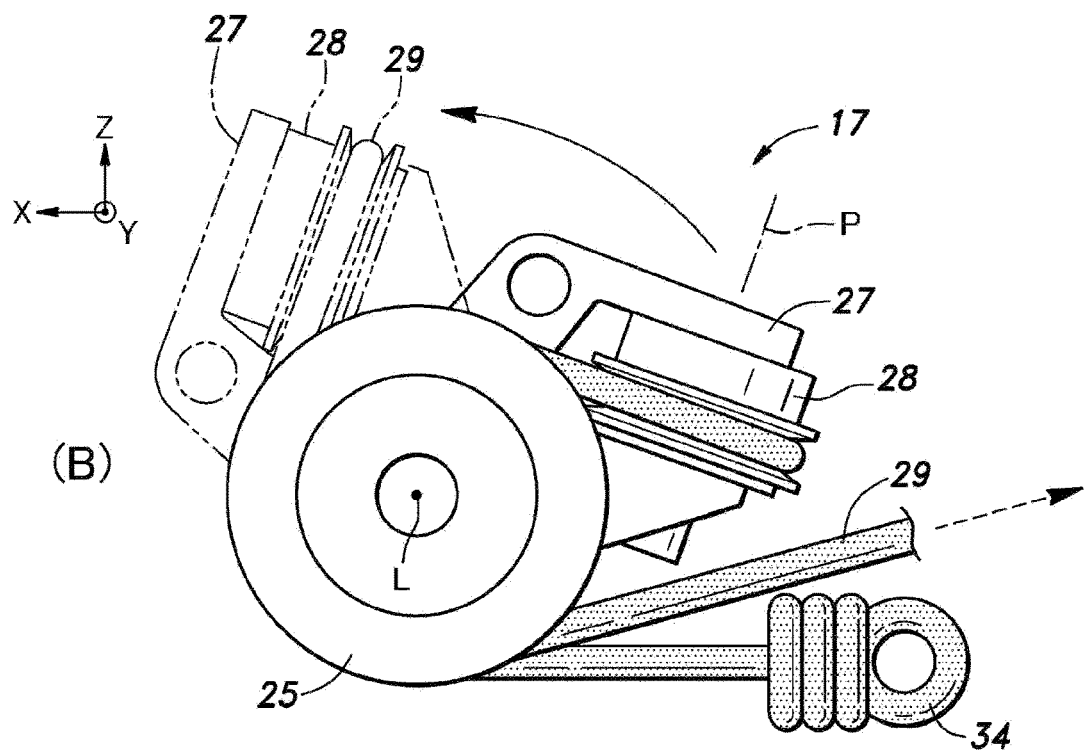

The second link driving part 17, as shown in (A) of FIG. 3, includes a first fixed pulley 25, a second fixed pulley 26, a lever link 27, a lever pulley 28, and a second link driving cable 29 (hanging cable). As shown in FIG. 2, the second link driving part 17 further includes a second actuator 31, a conversion mechanism 32, and a pullback mechanism 33.

As shown in (A) of FIG. 3, the first fixed pulley 25 has a cylindrical shape. A groove extending in the circumferential direction is provided on the outer circumferential surface of the first fixed pulley 25. The first fixed pulley 25 is provided so that the first axis L is the central axis, and is supported (that is, pivotally supported) by the palm part 2 to be rotatable. Accordingly, the first fixed pulley 25 is arranged to be rotatable around the first axis L with respect to the first link 8, and the first fixed pulley 25 and the first link driving pulley 21 rotate independently with respect to each other.

The second fixed pulley 26 is in substantially the same shape as the first fixed pulley 25. That is, the second fixed pulley 26 also has a cylindrical shape, and a groove extending in the circumferential direction is provided on the outer circumferential surface of the second fixed pulley 26. Like the first fixed pulley 25, the second fixed pulley 26 is provided so that the first axis L is the central axis, and is fixed to the palm part 2 (specifically, the connection part 2B). Since the first link 8 is rotatable around the first axis L with respect to the connection part 2B, the second fixed pulley 26 is arranged to be rotatable around the first axis L with respect to the first link 8. The second fixed pulley 26 and the first fixed pulley 25 are arranged to be substantially parallel. The second fixed pulley 26 and the first link driving pulley 21 rotate independently with respect to each other.

When viewed in the Y-axis direction, the lever link 27 is in an L shape. The lever link 27 is supported by the palm part 2 to be rotatable around the first axis L on an end side (proximal end side). The end side of the link lever 27 is located between the first fixed pulley 25 and the second fixed pulley 26.

The lever pulley 28 is provided on the other end side (free end) of the lever link 27. As shown in FIG. 3, the lever pulley 28 is located between the first fixed pulley 25 and the second fixed pulley 26 in Y direction. Like the first fixed pulley 25 and the second fixed pulley 26, the lever pulley 28 is in a cylindrical shape. Like the first fixed pulley 25 and the second fixed pulley 26, the lever pulley 28 is provided with a groove extending in the circumferential direction. A central axis P of the lever pulley 28 is orthogonal to the first axis L, and extends on a hypothetical plane S located between the first fixed pulley 25 and the second fixed pulley 26. The lever pulley 28 is supported by the free end of the lever link 27 to be rotatable with the central axis P as the center.

An end of the second link driving cable 29 is engaged with the palm part 2. In the embodiment, a hook 34 is provided at the end of the second link driving cable 29. The hook 34 is configured by bending the end of the second link driving cable 29 into a ring shape. The hook 34 is hooked at a hook position Q of the palm part 2. The hook 34, for example, may be hooked to the connection part 2B inside a concave part. The second link driving cable 29 extends from the end toward the second fixed pulley 26, and is hung, in the order as described, on the front edge of the second fixed pulley 26 in the X-axis direction, the rear edge of the lever pulley 28 in the X-axis direction, and the front edge of the first fixed pulley 25 in the X-axis direction.

The second actuator 31 is connected to the other end of the second link driving cable 29. The second actuator 31 is coupled to and supported by the palm part 2. The second actuator 31 pulls the other end of the second link driving cable 29. Accordingly, the second actuator 31 applies a tensile force (see the arrow sign in a broken line in (B) of FIG. 3) to the other end of the second link driving cable 29, and drives the second link driving cable 29. The second actuator 31, for example, is formed by an electric motor winding up the second link driving cable 29. The driving of the second actuator 31, for example, is controlled by a control device (not shown) provided in the chest of the robot.

When the second actuator 31 operates, the second link driving cable 29 is pulled. Accordingly, a load having a component toward the front in the X-axis direction is applied to the lever pulley 28. Accordingly, a torque is applied to the lever link 27 in a direction (see the arrow sign in a solid line in (B) of FIG. 3) tilting toward the front side on the X-axis, and the lever link 27 rotates around the first axis L.

As shown in FIG. 2, the conversion mechanism 32 is connected to the lever link 27 and the second link 9, and converts the rotation of the lever link 27 around the first axis L into the rotation of the second link 9 around the second axis M. The conversion mechanism 32 includes a second crank arm 36 provided at the second link 9 and a first auxiliary link 37.

The second crank arm 36 extends from the intermediate pivot part 13 of the second link 9. In the stretched state, the extending direction of the second crank arm 36 is toward a direction (negative direction of X-axis) approaching the palm part 2, and is inclined in a direction (positive direction of Z-axis) away from the finger pad part 6.

The first auxiliary link 37 is in a rod shape extending along the X-axis direction. The first auxiliary link 37 connects the second crank arm 36 and the lever link 27. Specifically, the front end of the first auxiliary link 37 in the X-axis direction is connected to the extending end of the second crank arm 36 to be rotatable with an axis extending in the Y-axis direction as the center. The rear end of the first auxiliary link 37 in the X-axis direction is connected to the free end of the lever link 27 to be rotatable with an axis extending in the Y-axis direction as the center. Accordingly, the first auxiliary link 37 is supported by the second crank arm 36 and the free end of the lever link 27 to be rotatable.

As shown in FIG. 2, with the lever link 27, the second crank arm 36, the first link 8, and the first auxiliary link 37, a first four-segment link mechanism 40 in which the lever link 27 is configured as a driving link and the second crank arm 36 is configured as a driven link is formed. As shown in FIG. 2, the first link 8 and the first auxiliary link 37 are parallel when viewed in the Y-axis direction. Accordingly, the first four-segment mechanism 40 is equivalent to a so-called parallel link mechanism. With the first four-segment mechanism 40, the rotation of the lever link 27 is converted into the rotation of the second link 9. That is, the second link 9 is linked to the lever link 27 and rotates with the second axis M as the center.

The pullback mechanism 33 includes a lever urging member 42 applying an urging force to resist the rotation of the lever link 27 around the first axis L driven by the second actuator 31. The lever urging member 42 urges the lever link 27 so that the free end of the lever link 27 moves in the negative direction of X-axis (that is, the direction opposite to the arrow sign of (B) of FIG. 3). The lever urging member 42 is formed by multiple coil springs, as shown in FIG. 1.

With the second actuator 31 and the pullback mechanism 33, a mechanism capable of rotating the lever link 27 around the first axis L and restoring the lever link 27 to the original position as needed is formed. That is, with the second actuator 31 and the pullback mechanism 33, a second link driving mechanism 43 capable of rotating the second link 9 via the conversion mechanism 32 through the driving of the second link cable 29 and restoring the lever link 27 to the original position as needed is formed.

The third link driving part 18 includes a first crank arm 44, a third crank arm 45, and a second auxiliary link 46.

The first crank arm 44 is provided at the first link 8. The first crank arm 44 extends from the intermediate pivot part 13 of the first link 8. In the stretched state, the extending direction of the first crank arm 44 is toward a direction (negative direction of X-axis) approaching the palm part 2 from the intermediate pivot part 13 of the first link 8 and is inclined in a direction (negative direction of Z-axis) toward the finger pad part 6.

The third crank arm 45 is provided at the third link 10. The third crank arm 45 extends from the free end pivot part 14 of the third link 10. In the stretched state, the extending direction of the third crank arm 45 is toward a direction (negative direction of X-axis) approaching the palm part 2 from the free end pivot part 14 of the third link 10 and is inclined in a direction (positive direction of Z-axis) away from the finger pad part 6.

The second auxiliary link 46 extends along the X-axis direction. The rear end of the second auxiliary link 46 in the X-axis direction is connected to the first crank arm 44 to be rotatable around an axis extending in the Y-axis direction. The front end of the second auxiliary link 46 in the X-axis direction is connected to the third crank arm 45 to be rotatable around an axis extending in the Y-axis direction. Accordingly, with the first crank arm 44, the second link 9, the third crank arm 45, and the second auxiliary link 46, a second four-segment link mechanism 50 in which the first crank arm 44 is configured as a driving link and the third crank arm 45 is configured as a driven link is formed.

In the embodiment, as shown in FIG. 1, an X-axis side end part of the second link 9 is bifurcated, and the second auxiliary link 46 passes through the bifurcated parts. When viewed in the Y-axis direction, the second auxiliary link 46 crosses the second link 9. Therefore, the second four-segment link mechanism 50 forms a so-called cross-link mechanism.

As shown in FIG. 2, the finger pad part 6 is coupled to a side surface of the X-axis side (free end side) end part of the third link 10 facing the negative direction of Z-axis.

In the following, the operation of the robot 1 so configured will be described with reference to FIGS. 4 and 5.

When the second actuator 31 drives to apply a tensile force to the second link driving pulley 29, the lever pulley 28 functions as a movable pulley and, as shown in (B) of FIG. 3, the lever link 27 rotates around the first axis L with respect to the palm part 2 to be inclined toward the X-axis direction. In the following, the direction in which the lever link 27 rotates due to the tensile force of the second actuator 31 is referred to as a positive direction.

Figure 4:
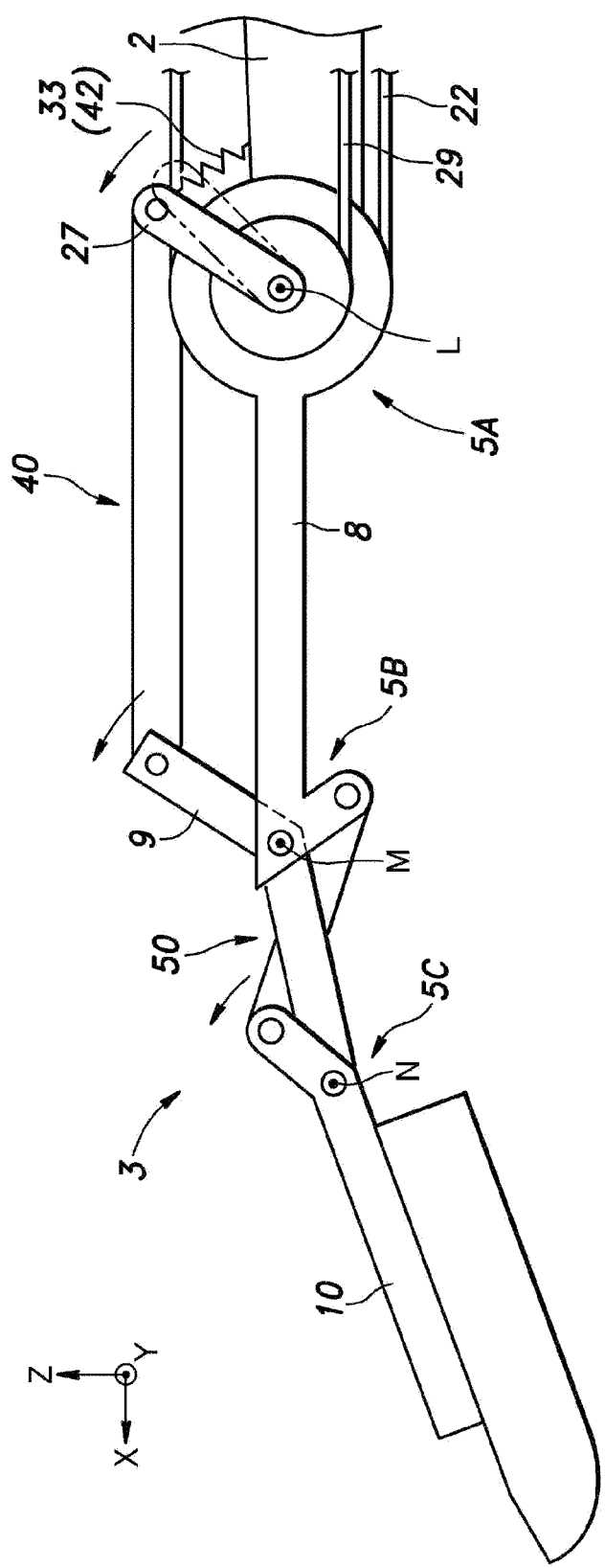
FIG. 4 is a schematic view illustrating the robot hand at a time when a second link rotates in a positive direction by the second link driving part.

When the lever link 27 rotates with respect to the palm part 2 in the positive direction, as shown in FIG. 4, due to the first four-segment link mechanism 40, the second link 9 is linked with the rotation of the lever link 27 to rotate around the second axis M. In addition, when the second link 9 rotates, due to the second four-segment link mechanism 50, the third link 10 is also linked to rotate around the third axis N. Accordingly, as shown in FIG. 4, the intermediate phalanx 5B and the end phalanx 5C of the finger part 3 are bent in a direction in which the robot hand 1 is closed.

When the second actuator 31 stops driving, through the pullback mechanism 33 (specifically, the lever urging member 42), the lever link 27 is urged to rotate in the negative direction and restored to the original position. Accordingly, the second link 9 is also linked with the lever link 27 to rotate around the second axis M to be restored to the original position. The third link 10 also rotates around the third axis N with respect to the second link 9 to be restored to the original position. Accordingly, the finger part 3 is stretched and restored to the state shown in FIG. 2, and the robot hand 1 is open.

When the first actuator 23 drives, the first link driving pulley 21 is rotated. Accordingly, the first link 8 rotates around the first link L with respect to the palm part 2. Accordingly, the base phalanx 5A of the finger part 3 is bent.

Figure 5:
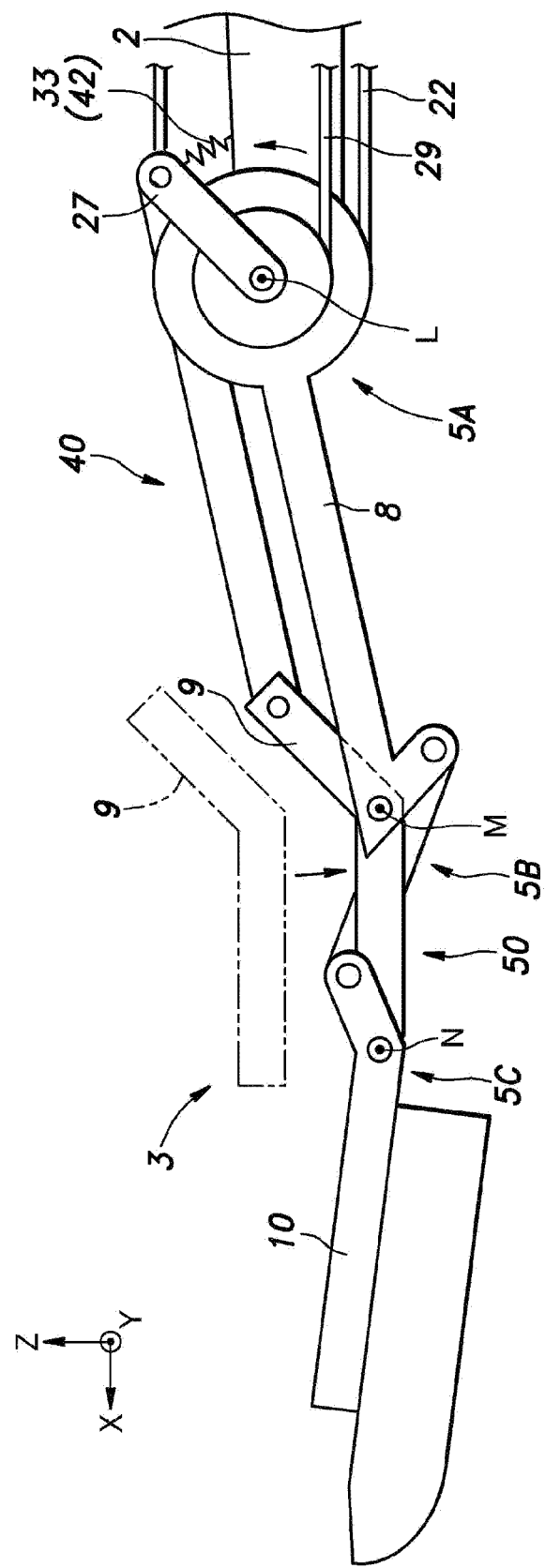
FIG. 5 is a schematic view illustrating the robot hand at a time when a first link rotates in a positive direction by a first link driving part.

When the first link 8 rotates around the first axis L in the positive direction due to the driving of the first actuator 23, as shown in FIG. 5, the lever link 27 rotates relatively around the first axis L with respect to the first link 8 in the negative direction. Accordingly, the second link 9 is linked to rotate around the second axis M. At this time, the rotation direction of the second link 9 is opposite to the case where the second actuator 31 drives (the case of FIG. 4). Accordingly, the intermediate phalanx 5B of the finger part 3 is bent in the direction (opposite direction) in which the finger is open. In FIG. 5, the position of the second link 9 when the finger part 3 is in the stretched state is shown by using a two-dot chain line. As can be understood from FIG. 5, although the second link 9 rotates with respect to the first link 8 and only the translational motion on the X-axis and Z-axis is performed, and the posture with respect to the palm part 2 does not change.

Due to the rotation of the second link 9 with respect to the first link 8, the third link 10 rotates with the third axis N as the center. At this time, the rotation direction of the third link 10 is opposite to the case where the second actuator 31 drives (the case of FIG. 4). Accordingly, the end phalanx 5C of the finger part 3 is also bent in the opposite direction.

When the first link 8 rotates around the first axis L in the negative direction due to the driving of the first actuator 23 and is restored to the original state, the second link 9 rotates around the first axis L with respect to the first link 8 and is restored to the original position. The third link 10 also rotates with respect to the second link 9 with the second axis M as the center, and is restored to the original position. Accordingly, the robot hand 1 returns to the state in which the finger part 3 is stretched.

Figure 6:
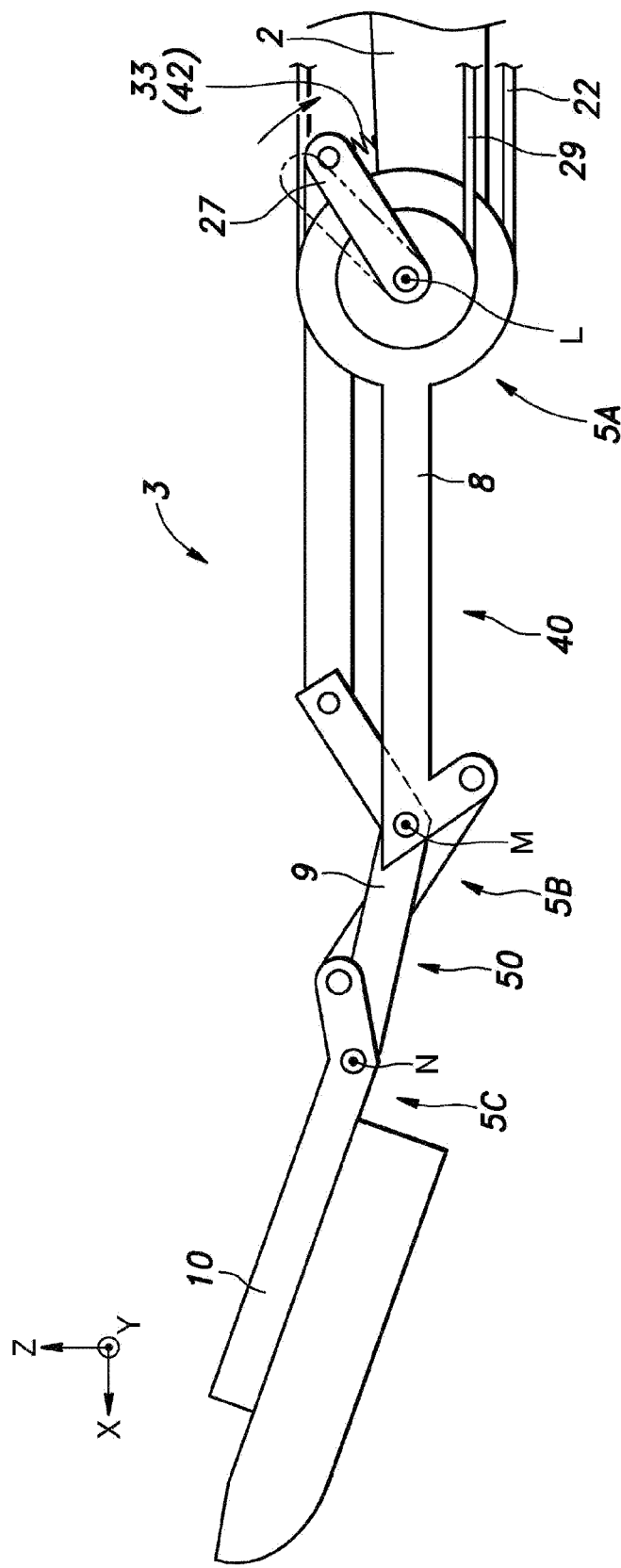
FIG. 6 is a hypothetical example in which only a lever link is rotated the same angle of FIG. 5 in a negative direction with respect to the palm part.

As shown in FIG. 5, when the first link 8 rotates around the first axis L in the positive direction due to the driving of the first actuator 23, the lever link 27 rotates relatively with respect to the first link 8 in the negative direction. FIG. 6 illustrates a hypothetical example in which only the lever link 27 is rotated the same angle as FIG. 5 with respect to the palm part 2 in the negative direction. As can be understood through comparing FIGS. 5 and 6, the rotation direction and the rotation angle of the second link 9 with respect to the first link 8 and the rotation direction and the rotation angle of the third link 10 with respect to the second link 9 in FIG. 6 are equal to those of FIG. 5.

Accordingly, when the first link 8 is rotated a predetermined angle θ with respect to the palm part 2 in the positive direction, and the second link 9 is rotated a predetermined angle φ with respect to the first link 8 in the positive direction, the control device may determine a driving amount of the first actuator 23 so that the first link driving pulley 21 rotates the angle θ in the positive direction, and determine a driving amount of the second actuator 31 so that the lever link 27 rotates an angle θ+φ with respect to the palm part 2 in the positive direction. The rotation angle of the third link 10 with respect to the second link 9 is a value obtained by integrating the rotation angle of the second link 9 with respect to the first link 8 with an angle ratio determined by the configuration of the cross-link mechanism (i.e., the second four-segment link mechanism 50).

Here, for the ease of description, an example in which the second link driving cable 29 is configured to not act on the first link driving pulley 21 is described. However, the invention is not limited to the configuration in which the second link driving cable 29 acts on the first fixed pulley 25 only. Specifically, in the case where the second pulley driving cable 29 acts on the first fixed pulley 25, the control device may determine the driving amounts of the first actuator 23 and the second actuator 31 depending also on the degree of action of the second link driving cable 29 on the first link driving pulley 21.

In the following, the effect of the robot hand 1 so configured will be described.

When the first actuator 23 drives, the first link 8 rotates with respect to the palm part 2. When the second actuator 31 drives, the second link 9 rotates with respect to the first link 8. Accordingly, in the case of generating a torque around the first axis L in the finger pad part 6, the driving of the first actuator 23 and the driving of the second actuator 31 can be used together to generate a torque in a total amount of the torques due to the respective driving. Accordingly, in the case of generating a torque around the first axis L in the finger pad part 6, by using the first actuator 23 and the second actuator 31 together, the loads of the respective actuators 23 and 31 can be reduced.

In this way, according to the invention, a mechanism (parallel mechanism) capable of using multiple actuators 23 and 31 together, and respectively adding torques around the axis L and the axis M parallel to each other to the respectively corresponding links 8 and 9 is formed. With such configuration, compared with the case where only one of the actuators 23 and 31 is provided, the load which the actuator 23 or 31 should bear can be reduced.

When the second actuator 31 drives to pull the second link driving cable 29, as shown in (B) of FIG. 3, the lever pulley 28 moves so that a portion of the second link driving cable 29 from the first fixed pulley 25 to the second fixed pulley 26 through the lever pulley 28 is reduced. At this time, the first fixed pulley 25 and the second fixed pulley 26 respectively function as fixed pulleys, and the lever pulley 28 functions as a movable pulley.

Therefore, a force twice of the tensile force (i.e., the driving force) output due to driving of the second actuator 31 is applied to the lever link 27. The force applied to the lever link 27 is transmitted to the second link 9 via the first four-segment link mechanism 40, which is a parallel link mechanism, and output from the second link 9. The force output from the second link 9 is equal to the link applied to the lever link 27. Accordingly, the force output from the second link 9 is twice of the tensile force output due to the driving of the second actuator 31. Accordingly, a force greater than the tensile force output due to the second actuator 31 can be generated in the second link 9.

Since the second crank arm 36 and the third crank arm 45 are connected by the cross-link mechanism, the movement of the finger pad part 6 when viewed from the second axis M is in a speed increasing direction, and the torque required for the second link 9 is increased. In the embodiment, by using the lever pulley 27 serving as a movable pulley, the torque output due to the second actuator 31 is output to the second link 9. Therefore, compared with the case where the torque generated by the second actuator 31 is output to the second link 9 by using a fixed pulley, the torque output to the second link 9 can be increased without increasing the diameter of the pulley.

With the first four-segment link mechanism 40, the displacement of the lever pulley 28 can be transmitted to the second link 9 away from the lever pulley 28. Moreover, by providing the first four-segment link mechanism 40 in the robot hand 1, the palm part 2 and the second link 9 can be connected with high rigidity. Since the first four-segment link mechanism 40 is a parallel link mechanism, the rotation angle of the lever link 27 and the rotation angle of the second link 9 are equal, and the posture control of the second link 9 becomes easy.

With the pullback mechanism 33, the lever link 27 can be urged in a direction opposite to the rotation direction due to the second actuator 31. Accordingly, since the lever link 27 can be urged in the direction opposite to the rotation direction due to the second actuator 31 when the driving of the second actuator 31 stops, the lever link 27 can rotate in the opposite direction and be restored to the original position. In addition, since the pullback mechanism 33 is formed by the lever urging member 42 (coil springs in this embodiment), the configuration of the pullback mechanism 33 is simple.

The lever pulley 28 is located between the first fixed pulley 25 and the second fixed pulley 26 and supported by the lever link 27 to be rotatable with a movable axis as the center. The movable axis extends in a direction orthogonal to the first axis L. With such configuration, the first fixed pulley 25, the second fixed pulley 26, and the lever pulley 28 can be arranged together in a small size. Therefore, the second link driving part 17 can be compact, and the robot hand 1 can be miniaturized.

The third link 10 is rotatably connected to the other end side of the second link 9. The third link 10 is connected to the first link 8 via the second four-segment link mechanism 50, and moves in conjunction with the first link 8. Accordingly, with the third link 10 being connected to the second link 9, an object further than the second link 9 can be accessed. Moreover, the number of joints of the finger part 3 of the robot hand 1 meets the number in a human finger. Therefore, it is possible for the robot hand to perform an operation close to a human hand.

The third link 10 is linked to the rotation of the second link 9 with respect to the first link 8 and rotates with respect to the second link 9. The rotation angle of the third link 10 is a value obtained by integrating the rotation angle of the second link 9 with respect to the first link 8 with the angle ratio determined by the configuration of the second four-segment link mechanism 50 (that is, the cross-link mechanism). Accordingly, the ratio between the rotation angle of the third link 10 with respect to the second link 9 and the rotation angle of the second link 9 with respect to the first link 8 can remain constant, and the third link 10 is rotated with respect to the second link 9. Accordingly, the rotation angle of the third link 10 can be strictly controlled, and it is possible to perform driving with elasticity of the finger pad part 6 and perform driving meeting a mating shape.

Accordingly, by configuring the robot hand 1 including the three joints of the base phalanx 5A, the intermediate phalanx 5B, and the end phalanx 5C, the robot hand 1 closer to a human hand can be realized. In addition, by using the driving mechanism 4 using a movable pulley, a greater torque can be generated in the finger part 3, and it is possible to grip a large object with a heavy weight. Moreover, the driving mechanism 4 can be miniaturized, and a region in which the palm part 2 can contact an object can be enlarged. Accordingly, the robot hand 1 can more firmly grip an object. Also, by miniaturizing the driving mechanism 4, it is easy to install a sensor, such as a touch sensor, other parts or devices, etc., in the robot hand 1.

Second Embodiment

Compared with the first embodiment in which the second actuator 31 is provided for each finger part 3, a robot hand 101 according to the second embodiment differs in that one second actuator 131 simultaneously driving two finger parts 3 is provided. In addition, the robot hand 101 according to the second embodiment also differs from the first embodiment in that an auxiliary fixed pulley 102 is provided in each connection part 2B connecting the finger part 3 and the palm part main body 2A. Furthermore, the robot hand 101 according to the second embodiment differs from the first embodiment in that only one second link driving cable 129 is provided. The remaining of the second embodiment is substantially the same as the first embodiment. Therefore, the descriptions about the remaining configuration will be omitted.

Figure 7:
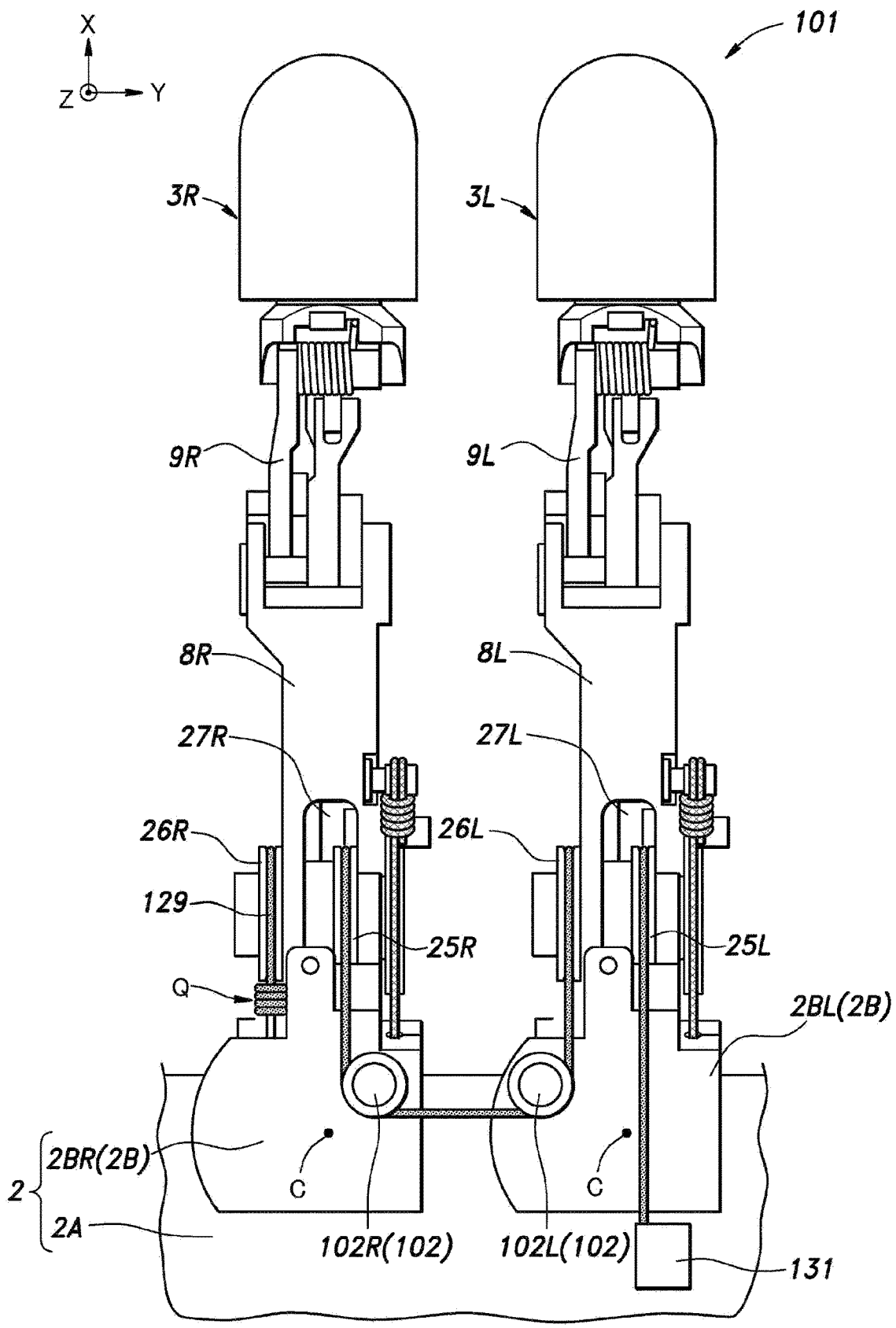
FIG. 7 is a front view illustrating a robot hand, when viewed from an inner side of a palm, according to a second embodiment.

FIG. 7 illustrates the robot hand 101 when viewed from the inner side of the palm (the back side of the hand, or the pad side of the finger pad 6). As shown in FIG. 7, the robot hand 101 includes two finger parts 3 arranged side-by-side in a parallel direction (a direction orthogonal to the stretching direction of the finger part 3, or the Y direction). The two finger parts 3 are driven by one second actuator 131. In the following, one of the two finger parts 3 arranged side-by-side in parallel is referred to as a left-side (positive side of Y-axis) finger part 3L and the other finger part 3 is referred to as a right-side (negative side of Y-axis) finger part 3R. In addition, components corresponding to the left-side finger part 3L are labeled with the symbol "L", whereas components corresponding to the right-side finger part 3R are labeled with the symbol "R". However, the "left" and "right" are merely for the ease of description, and the arrangement of the two finger parts 3L and 3R shall not be limited to the description.

The auxiliary fixed pulleys 102 are respectively provided in connection parts 2BL and 2BR corresponding to the left-side finger part 3L and the right-side finger part 3R. However, the auxiliary fixed pulleys 102 may also be respectively provided in the palm part main body 2A. The hook 34 is provided at one end of the second link driving cable 129, and, like the first embodiment, is hooked at the hook position Q in the connection part 2BR of the right-side finger part 3R. The second link driving cable 129 extends from the hook position Q toward the second fixed pulley 26 of the right-side finger part 3R, and is hung, in the order as described, on the front edge of the second fixed pulley 26R of the right-side finger part 3R in the X-axis direction, the rear edge of the lever pulley (not shown) of the right-side finger part 3R in the X-axis direction, and the front edge of the first fixed pulley 25R of the right-side finger part 3R in the X-axis direction. Then, the second link driving cable 129 is hung on the right-side auxiliary fixed pulley 102R and the left-side auxiliary fixed pulley 102L in order.

Then, the second link driving cable 129 extends from the left-side auxiliary fixed pulley 102L to the second fixed pulley 26L of the left-side finger part 3L, and is hung, in the order as described, on the front edge of the second fixed pulley 26L of the left-side finger part 3L in the X-axis direction, the rear edge of the lever pulley (not shown) of the left-side finger part 3L in the X-axis direction, and the front edge of the first fixed pulley 25L of the left-side finger part 3L in the X-axis direction, and is connected to the second actuator 131.

The operation of the robot hand 101 so configured will be described. At the time when the left-side finger part 3L and the right-side finger part 3R are respectively in the stretched state, if the second actuator 131 drives, the second link driving cable 129 is exerted with a pulling force and, like the first embodiment, the lever links 27L and 27R of the left-side finger part 3L and the right-side finger part 3R respectively rotate around the first axis L. Accordingly, the second links 9L and 9R on the left and right respectively rotate with respect to the first links 8L and 8R, and the intermediate phalanxes 5B and the end phalanxes 5C of the left-side finger part 3L and the right-side finger part 3R are bent. When the second actuator 131 stops driving, the lever links 27L and 27R on the left and right are respectively urged by the lever urging member 42 to be restored to the original positions. Accordingly, the lever links 27 are rotated to be restored to the original positions and the left-side finger part 3L and the right-side finger part 3R are restored to the stretched state.

In the following, the effect of the robot hand 101 so configured will be described. In the robot hand 101, the two finger parts 3L and 3R can be driven by one second actuator 131 and one second link driving cable 129. In this way, it is not necessary to provide the second link driving cable 129 and the second actuator 131 for each of the finger parts 3L and 3R, the number of driving cables can be reduced, and the number of driving actuators can be reduced as well. In addition, with such configuration, the robot hand 101 naturally fits the shape of the object to be gripped.

Meanwhile, it is also considered to connect the second actuator to two second link driving cables respectively provided in the left and right finger parts via a predetermined cable ("distribution cable" in the following), and distribute the driving force generated by the second actuator. In this case, the second actuator needs to generate a driving force proportional to the number of fingers that are linked, and applies a tension proportional to the number of fingers to the distribution cable. In this way, when the tension applied to the cable is increased, the cable, the cable outer casing thickness, and the strength requirement on the pulley bearing, etc., are increased, which leads to an increase in size and weight.

Meanwhile, in the second embodiment, although the cable winding length is increased, the driving force to be generated by the second actuator 131 is constant even in the case where the number of the finger parts 3 is increased. Therefore, the configuration of the second embodiment is advantageous in design.

Although the second embodiment describes the case where the finger parts 3L and 3R are arranged side-by-side on the left and right, the configuration is not limited thereto. The same effect can be achieved even in a robot hand in which two finger parts or three finger parts are arranged opposite to one another. According to the configuration of the second embodiment, a robot hand in which the number of actuators is reduced and which fits various object shapes to grip the objects can be configured.

Although specific embodiments are described as the above, the invention can be widely modified without being limited to the above embodiment. In addition, the specific configuration, arrangement, quantity, and predetermined procedures of the respective members and parts can be modified as appropriate as long as such modification is not deviated from the gist of the invention. Meanwhile, not all of the components shown in the above embodiments are indispensable, and the components can be appropriately selected. Although the second actuator 31 is configured to wind up one end of the second link driving cable 29, the second actuator 31 may also be connected to two ends of the second link driving cable 29 and rotate the second link 9 in two directions by selectively winding up one of the two ends of the second link driving cable 29. In addition, the third link 10 is not required and may be omitted. The first link 8 may be fixed to the palm part 2 and may also be integrated with the palm part 2. However, by providing a joint between the first link 8 and the palm part 2, it is possible for the robot hands 1, 101 to perform various operations.

What is claimed is:

1. A robot hand, comprising:
   a first link;
   a first fixed pulley and a second fixed pulley, respectively provided at a proximal end pivot part of the first link and rotatable around a first axis with respect to the first link;
   a second link, supported at an intermediate pivot part by the first link to be rotatable around a second axis;
   a lever link, having a proximal end supported by the proximal end pivot part of the first link to be rotatable around the first axis;
   a lever pulley, supported by a free end of the lever link to be rotatable;
   a hanging cable, hung on the first fixed pulley, the lever pulley, and the second fixed pulley;
   a conversion mechanism, connecting the lever link and the second link, and converting rotation of the lever link around the first axis into rotation of the second link around the second axis; and
   a second link driving mechanism, rotating the lever link around the first axis by driving the hanging cable.

2. The robot hand as claimed in claim 1,
   wherein the robot hand has a base part supporting, at the proximal end pivot part, the first link to be rotatable around the first axis, and the second fixed pulley is supported by the base part.

3. The robot hand as claimed in claim 2,
wherein the robot hand has a first link driving part driving rotation of the first link around the first axis, and
the first axis is parallel to the second axis.

4. The robot hand as claimed in claim 3,
wherein the first link driving part has a first link driving pulley fixed to the first link so that the first axis is a central axis, a winding cable wound around the first link driving pulley, and a first actuator rotating the first link driving pulley by driving the winding cable.

5. The robot hand as claimed in claim 1,
wherein the second link driving mechanism comprises a second actuator rotating the lever link around the first axis by pulling the hanging cable.

6. The robot hand as claimed in claim 5,
wherein the second link driving mechanism comprises a lever urging member applying an urging force to resist the rotation of the lever link around the first axis by the second actuator.

7. The robot hand as claimed in claim 1,
wherein the lever pulley is located between the first fixed pulley and the second fixed pulley, and has a central axis extending on a hypothetical plane orthogonal to the first axis.

8. The robot hand as claimed in claim 1,
wherein the conversion mechanism comprises a second crank arm extending from the intermediate pivot part of the second link and a first auxiliary link supported by the second crank arm and the free end of the lever link to be rotatable, and
a first four-segment link mechanism is formed by the lever link, the first auxiliary link, the first link, and the second crank arm.

9. The robot hand as claimed in claim 8,
wherein the first four-segment link mechanism is a parallel link mechanism.

10. The robot hand as claimed in claim 1, further comprising:
a third link pivotally supported at a free end pivot part by the second link, a first crank arm extending from the intermediate pivot part of the first link, a third crank arm extending from the free end pivot part of the third link, and a second auxiliary link rotatably coupled to the first crank arm and the third crank arm,
wherein a second four-segment link mechanism forms a cross-link mechanism with the first crank arm, the second link, the third crank arm, and the second auxiliary link.

* * * * *